P. A. LAMB.
AIR VALVE.
APPLICATION FILED MAY 14, 1919.
1,369,343.
Patented Feb. 22, 1921.
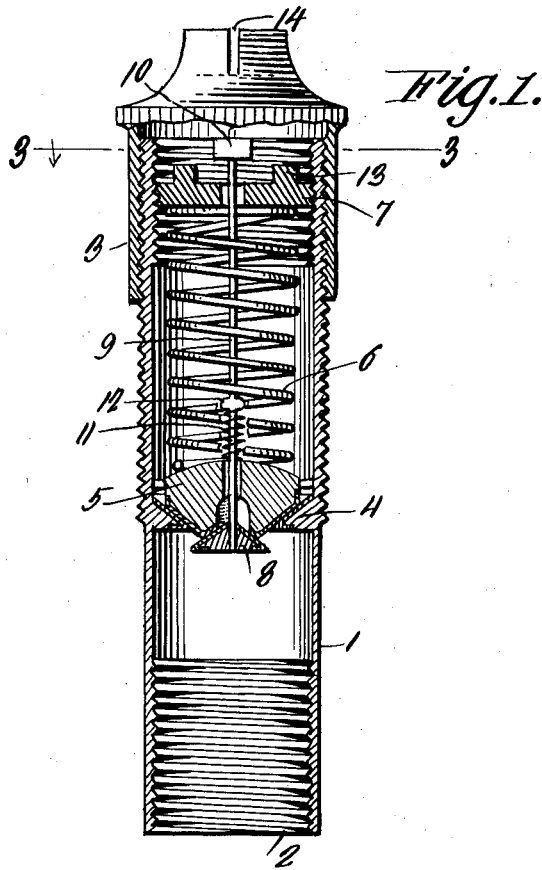
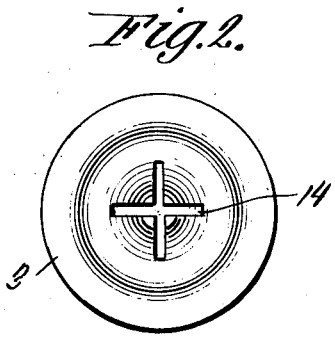
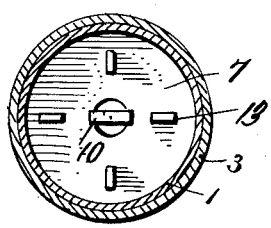
WITNESSES
Guy M. Spring
U. B. Hillyard.
Inventor
PAUL A. LAMB
By Richard B. Owen
Attorney

UNITED STATES PATENT OFFICE.

PAUL A. LAMB, OF YATES CENTER, KANSAS.

AIR-VALVE.

1,369,343.  Specification of Letters Patent.  Patented Feb. 22, 1921.

Application filed May 14, 1919. Serial No. 297,091.

*To all whom it may concern:*

Be it known that I, PAUL A. LAMB, a citizen of the United States, residing at Yates Center, in the county of Woodson and State of Kansas, have invented certain new and useful Improvements in Air-Valves, of which the following is a specification.

The primary purpose of this invention is to prevent blow-out of pneumatic tires from excessive internal pressure due to expansion of the confined air when the tires become heated or from over inflation when pumping up the tire, or from other causes.

The invention provides a valve which will admit of a tire or other pneumatic device being readily inflated in the usual way and which will relieve excessive internal pressure and thereby prevent injury to the tire or other pneumatic device.

The drawing illustrates a preferred embodiment of the invention. However, it is to be understood that in adapting the same to meet different conditions, various changes in the form, proportion, and minor details of construction may be resorted to without departing from the nature of the invention as claimed hereinafter.

Referring to the drawing hereto attached, Figure 1 is a vertical central section of an air valve embodying the invention.

Fig. 2 is a top view of the cap.

Fig. 3 is a horizontal section on the line 3—3 of Fig. 1.

Corresponding and like parts are referred to in the following description and indicated in the several views of the drawing by like reference characters.

The valve comprises a casing 1 which may consist of a short tube similar to the stems of air valves as commonly provided for pneumatic tires and inflatable articles. In the present instance the casing 1 is internally screw-threaded, as indicated at 2 so as to be readily coupled to the stems of air valves as commonly provided in connection with inner tubes of pneumatic tires. A cap 3 is adapted to close the outer end of the casing 1 and is threaded thereon. A valve seat 4 is provided within the casing at a suitable point and a stemless valve 5 is adapted to close downwardly thereon. A spring 6 normally holds the valve 5 seated and the tension of the spring 6 may be varied to admit of the valve 5 unseating at approximately any given pressure exerted upon the lower side of the valve. A follower 7 is threaded into the upper portion of the casing 1 and engages the upper end of the spring 6. By advancing or withdrawing the follower 7 the tension of the spring 5 may be adjusted to admit of the valve 5 unseating at any predetermined pressure. The spring 6 is of the expansible helical variety so that it may be compressed more or less by means of the follower 7. The valve 5 is provided with a central opening and its lower end is of conical form and provided with a seat for a valve 8 to close upwardly against. A stem 9 carries the valve 8 and passes through the follower 7 and has a stop 10 at its upper end to limit the unseating of the valve 8. A relatively light spring 11 coöperates with the valve stem 9 to normally hold the valve 8 seated. The spring 11 is of the expansible helical variety and is confined between the valve 5 and a stop 12 on the stem 9.

When the parts are assembled they assume the relation substantially as indicated in Fig. 1. The follower 7 consists of a disk or plug and is provided on its upper side with projections 13 which are adapted to be engaged by any suitable device whereby the follower may be turned to screw it into the casing 1 or unscrew it therefrom when adjusting the tension of the spring 6. The outer end of the cap 3 may be formed to engage the projections 13 in a manner well understood, thereby providing for the convenient turning of the follower as occasion may require.

It is to be understood that the casing 1 may be applied directly to an inner tube or other pneumatic article. However, to adapt the valve for use in connection with articles already equipped with pneumatic valves the coupling end of the casing 1 is constructed to make screw-thread engagement with the usual valve stem. When the present valve is applied to a valve stem already in service the valves inside of such stem are removed, the valve 8 serving to confine the air supplied to the inner tube or other article for inflating the same. Should the air within a tire expand from any cause as when speeding the excessive pressure is relieved by the automatic unseating of the relief valve 5 which opens when the confined air pressure exceeds the tension of the spring 6 exerted on the valve 5 to hold the same closed. It will also be observed that over inflation cannot be maintained because the valve 5 will unseat and provide a relief. The slots 14 in the cap 3 provide an escape for the air as well as serving as means to engage the projections 13 when turning the follower 7.

The foregoing description and the drawing have reference to what may be considered the preferred, or approved form of my invention. It is to be understood that I may make such changes in construction and arrangement and combination of parts, materials, dimensions, et cetera, as may prove expedient and fall within the scope of the appended claim.

Having thus fully described my invention, what I claim as new and desire to secure by Letters Patent is:—

An air valve, comprising a casing internally threaded at its inner or attaching end and both internally and externally threaded at its outer end and having an inner valve seat intermediate its ends, a stemless valve closing downwardly on the said seat, and having a central opening and a valve seat on its lower face in line with the opening, a relatively large spring supported on the valve, a follower within the casing and having screw threaded connection therewith and engaging the spring to adjust the tension thereof, an air controlled valve closing upwardly on the seat of the stemless valve and having a stem passing therethrough and through the follower to be readily accessible at its upper end, a light spring confined between a stop thereon and the stemless valve, and a cap closing the upper end of the casing, said cap and follower provided with co-mating means to admit of the turning of said follower by the said cap when in a reversed position, the light spring located within the convolutions of the first mentioned spring and bearing upon the upper surface of the stemless valve.

In testimony whereof I affix my signature in presence of two witnesses.

PAUL A. LAMB.

Witnesses:
L. R. WALLACE,
W. E. HOGUELAND.